Dec. 15, 1931.  J. C. WHITE  1,837,001

PRESSURE REDUCING VALVE

Filed Nov. 19, 1928  2 Sheets-Sheet 1

Inventor:
John C. White
By: Ira J. Wilson
Atty.

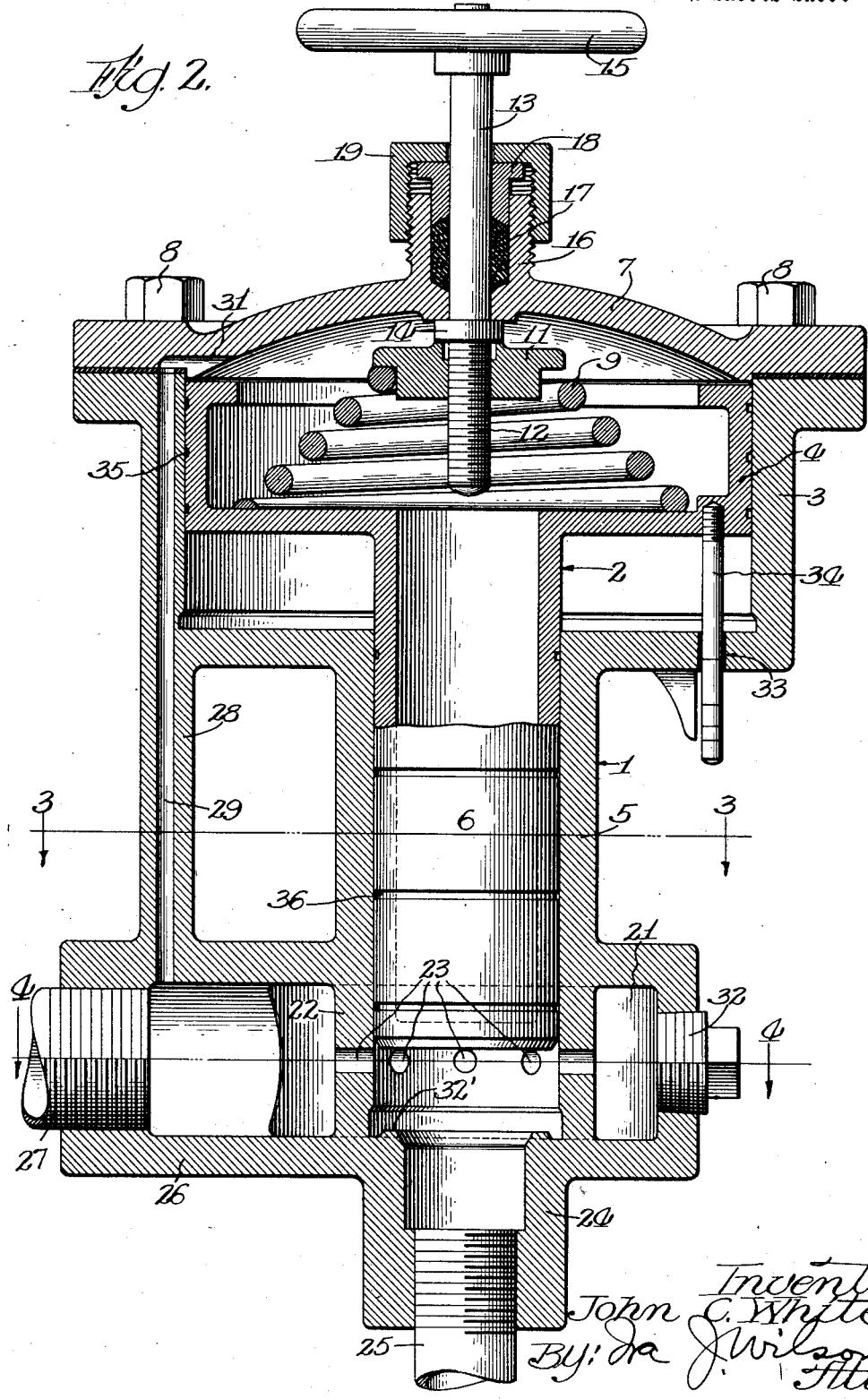

Patented Dec. 15, 1931

1,837,001

UNITED STATES PATENT OFFICE

JOHN C. WHITE, OF MADISON, WISCONSIN

PRESSURE REDUCING VALVE

Application filed November 19, 1928. Serial No. 320,226.

This invention relates to pressure reducing valves in general.

It is highly desirable to provide a pressure reducing valve which is rugged and not likely to fail at critical times, and which does not require frequent renewals of parts.

The primary object of this invention is accordingly to provide such a valbe and one in which the diaphragm is eliminated and a differential piston having opposed differential areas of predetermined ratio is substituted.

Another desirable feature in reducing valves is to provide means for throttling the fluid passing through the valve in such a manner that wire-drawing will be eliminated and it is therefore another object of this invention to provide such a means.

A further object of this invention is to provide in conjunction with the aforementioned throttling means an auxiliary seat for use in emergencies for preventing an extreme rise in pressure on the downstream or low side of the valve.

Figure 1:
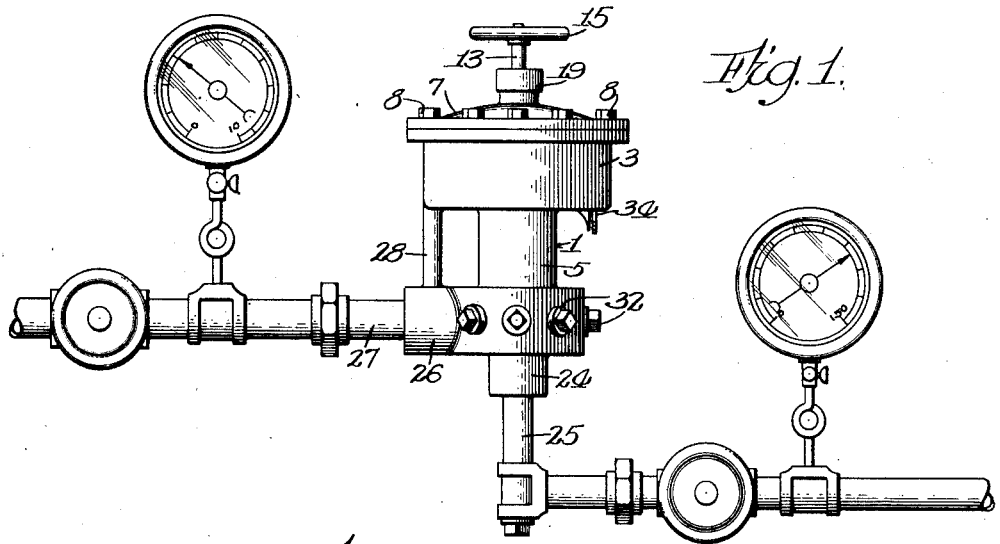
Figure 3:
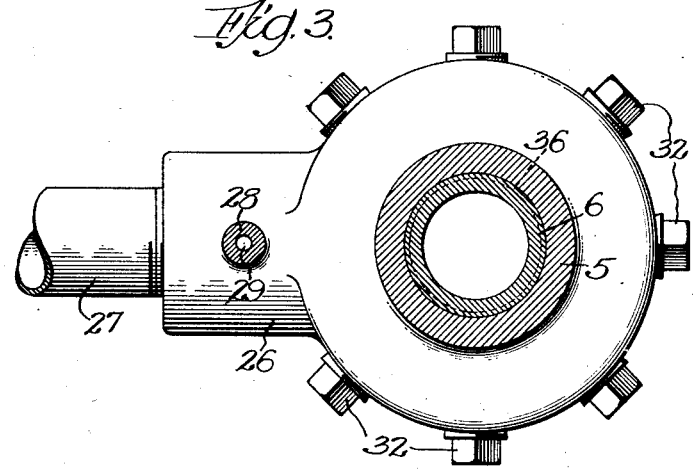
Figure 4:
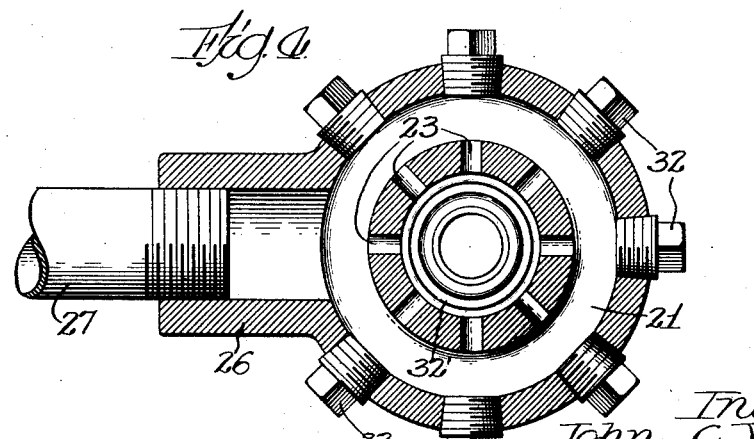

Other and further objects of this invention will be apparent as the same becomes better understood from an examination of the specification and claims in conjunction with the accompanying drawings wherein:

Fig. 1 is an elevational view of a valve embodying this invention and connections from said valve to the line in which it is used, Fig. 2 is an enlarged vertical mid-sectional view of the valve, Fig. 3 is a section taken at the line 3—3 of Fig. 2, and Fig. 4 is a section taken at the line 4—4 of Fig. 2.

Referring to the drawings more particularly, reference character 1 designates the body of the valve which is bored internally to receive differential piston 2. The body 1 comprises an enlarged upper cylindrical portion 3 for the larger piston 4 of the differential piston 2 and a reduced cylindrical portion 5 for the smaller piston 6 of said piston 2.

A cover 7 is provided for the body 1 and is attached to said body above the larger cylindrical portion 3 thereof by means of bolts 8.

An expansion spring 9 is disposed on the piston 4 between the base of said piston and a nut 11 threaded on an adjusting screw 12. The adjusting screw 12 is provided with a spindle 13 and a collar 14 limiting the upward movement of the spindle and permitting the rotation thereof to vary the vertical position of the nut 11 to vary the compression on the spring without altering the vertical position of the spindle. A handwheel 15 is provided for turning the spindle 13.

A stuffing box 16 is formed on a cover 7 around the aperture therein for the spindle 13, and this box contains packing 17 adapted to be compressed by gland 18 and gland nut 19 therefor.

The body 1 is provided with an annular chamber 21 surrounding the lower end of the piston 6 and separated therefrom by a cylindrical wall 22. This wall 22 is provided with a plurality of angularly spaced ports 23 adapted to establish communication between the chamber 21 and the interior of the cylindrical portion 5 of the body 1 when they are opened by the piston 6.

The lower end of the body 1 is provided with a cylindrical extension 24 in alignment with the cylindrical portion 5 and inwardly threaded to receive the high pressure side of the line 25 whereby the high pressure fluid may be admitted to the interior of the cylindrical portion 5 and may flow through the ports 23 when the same are opened by the lifting of the piston 6. A laterally extending cylindrical extension 26 is provided on the body 1 in communication with the chamber 21 and this extension is also inwardly threaded to receive the low pressure side of the line 27. An integral cylindrical connection 28 is provided between the cylindrical extension 26 and the upper large cylindrical portion 3, and this connection is provided with a drilled passage or duct 29 for establishing communication between the interior of said extension 26 and the upper side of the piston 4. The cover 7 is provided with a groove 31 forming an outlet for said passage 29. Thus fluid pressure on the downstream side may act on the upper side of the piston 4 to tend to close the slide valve which is in the form of the piston 6 while the fluid pressure on the upstream side acts on the base of the latter piston to initially open the valve and tend to keep the same open. The ratio of these opposing areas is predetermined and provides a differential which determines the amount of pressure reduction effected by the valve.

Plugs 32 are provided for filling openings formed in the body 1 through which the ports 23 were drilled.

A raised seat 32' is provided at the base of the cylindrical portion 5 of the body, and this seat is adapted to be engaged by the bottom of the piston 6 in the event of an emergency to prevent extreme pressures occurring on the low side of the valve by shutting off the flow completely.

A vent opening or duct 33 is provided on the body 1 on the under side of the cylindrical portion 3 thereof for permitting the free movement of the piston 4 in said cylindrical portion. An indicator in the form of a rod 34 threaded in the bottom of the piston 4 depends therefrom through the opening 33 and is graduated to show the position and movement of the piston 4.

Vertically spaced circular grooves 35 and 36 are provided on the pistons 4 and 6 respectively which serve to balance pressures over the entire circumference of these pistons for preventing undue friction and for reducing leakage.

The spring 9 together with the spindle for adjusting the compression thereof may be omitted where the pressure on the high side is held practically constant and the piston areas may be so proportioned as to automatically give the desired pressure on the reduced side. But, since the pressures are inversely proportional to the ratio of the piston areas and therefore a wide variation on the high pressure side will result in a corresponding pressure on the low side, the spring is ordinarily necessary to give constant pressure on the low side, particularly when the pressure on the high side is subject to wide variations.

It will be apparent that the aforedescribed valve, by avoiding the use of a diaphragm, is particularly rugged and not likely to fail at critical times. The action of the valve is positive and there is little likelihood of leakage.

Since the piston 6 operates as a slide valve in opening and closing the ports 23 for throttling the fluid passing from the high side to the low side of the valve, wire-drawing is eliminated.

The operation and other advantages of the valve will be apparent without further description.

I am aware that many changes might be made without departing from the principles of the invention and I therefore do not wish to be limited to the details shown and described.

I claim:

1. In a regulating valve, the combination of a housing provided with an inlet and outlet and a partition therebetween, said partition having a plurailty of ports therethrough, a piston valve member for controlling said ports and adapted to be automatically opened under the action of fluid pressure on the upstream side of the passage, a piston, a duct connecting one side of said piston to the fluid in the downstream side of said passage and a duct connecting the opposite side of said piston to the atmosphere, said piston being operatively connected to said piston valve member whereby movement of the piston in one direction may cause the restriction of flow through said ports.

2. In a regulating valve, a housing, a slide valve member adapted to be opened by the pressure on the upstream side of the valve, the housing being provided with a passage therethrough controlled by one portion of said valve member, said housing having ports therethrough adapted to be covered and uncovered by another portion of said valve member, a piston, a duct connecting one side of said piston to the fluid in the downstream side of said passage and a duct connecting the opposite side of said piston to the atmosphere, said piston being operatively connected to said valve member whereby movement of the piston in one direction may cause the restriction of flow through said ports and said passage.

3. In a regulating valve, a housing, a slide valve member arranged to be opened by the pressure on the upstream side of the valve, the housing being provided with a passage therethrough controlled by one portion of the valve, said housing having a ported partition in said passage ports positioned to be covered and uncovered by another portion of said valve, a piston, a duct connecting one side of said piston to the fluid in the downstream side of said passage and a duct connecting the opposite side of said piston to the atmosphere, said piston being operatively connected to said valve member whereby movement of the piston in one direction may cause the restriction of flow through said ports and said passage, the said two pistons having opposed pressure areas bearing a predetermined ratio to each other.

4. In a regulating valve, a housing provided with an inlet and an outlet separated by a partition wall therebetween said wall having a port therethrough, a piston valve member for controlling the flow through said port, said member being in communication with and adapted to be automatically opened by the fluid pressure on the upstream side of the passage, a piston within said housing, a duct connecting one side of said piston with the downstream side of said passage, said piston being operatively connected to said valve member for movements therewith, and a vent establishing communication between the other side of said piston and the atmosphere, said inlet, outlet partition wall and port therethrough being arranged to prevent the normal flow of fluid therethrough from passing through the piston chamber.

5. In a regulating valve, a housing, a slide valve arranged to be opened by the pressure on the upstream side of the valve, the housing being provided with an inlet and an outlet connected by a passage and a partition between said inlet and outlet, said partition having a plurality of ports therethrough positioned to be covered and uncovered by said valve, a piston, a duct connecting one side of said piston to the fluid in the downstream side of said passage and a duct connecting the opposite side of said piston to the atmosphere, said piston being operatively connected to said valve member whereby movement of the piston in one direction may cause the restriction of flow through said ports, the said two pistons having opposed pressure areas bearing a predetermined ratio to each other.

In witness of the foregoing I affix my signature.

JOHN C. WHITE.